US010035662B2

(12) United States Patent
Owczarek et al.

(10) Patent No.: US 10,035,662 B2
(45) Date of Patent: Jul. 31, 2018

(54) CLEANING SYSTEM FOR A TRANSPORTING AND STORING DEVICE HAVING ADJUSTABLE CAPACITY FOR TOBACCO INDUSTRY ROD-LIKE ELEMENTS

(71) Applicant: INTERNATIONAL TOBACCO MACHINERY POLAND SPOLKA Z OGRANICZONA ODPOWIEDZIALNOSCIA, Radom (PL)

(72) Inventors: Radoslaw Owczarek, Radom (PL); Adam Gielniewski, Kowala (PL); Jakub Poter, Radom (PL)

(73) Assignee: INTERNATIONAL TOBACCO MACHINERY POLAND SPOLKA ORGANICZONA ODPOWIEDZIALNOSCIA, Radom (PL)

( * ) Notice: Subject to any disclaimer, the term of this patent is extended or adjusted under 35 U.S.C. 154(b) by 0 days.

(21) Appl. No.: 15/465,486

(22) Filed: Mar. 21, 2017

(65) Prior Publication Data
US 2017/0275101 A1    Sep. 28, 2017

(30) Foreign Application Priority Data
Mar. 22, 2016    (EP) .................... 16161665

(51) Int. Cl.
*B65G 45/22*    (2006.01)
*A24C 5/35*    (2006.01)
*B65G 47/51*    (2006.01)

(52) U.S. Cl.
CPC ................ *B65G 45/22* (2013.01); *A24C 5/35* (2013.01); *B65G 47/5122* (2013.01); *B65G 47/5131* (2013.01); *B65G 2201/0226* (2013.01)

(58) Field of Classification Search
CPC ..................................................... B65G 45/22
(Continued)

(56) References Cited

U.S. PATENT DOCUMENTS 5,111,929 A * 5/1992 Pierick ..................... A21B 3/16
134/145
6,035,996 A * 3/2000 Swift ..................... B65G 45/22
198/495

(Continued)

OTHER PUBLICATIONS

European Search Report EP 16161665.1—dated Aug. 26, 2016.

*Primary Examiner* — William R Harp
(74) *Attorney, Agent, or Firm* — Soody Tronson; STLG Law Firm (57) ABSTRACT

A cleaning system for a transporting and storing device having adjustable capacity for tobacco industry rod-like elements, the device comprising at least one circular conveyor located on a stationary support element of the device and at least one circular conveyor of the device located on a rotary support element, wherein the conveyors are arranged one above another. The cleaning system comprises a plurality of cleaning units attached to the support elements and oriented towards a transporting surface of the conveyor located below a corresponding cleaning unit of the plurality of cleaning units and configured to remove contaminations from the transporting surface of the conveyor. At least a first cleaning unit of the plurality of cleaning units is attached to the stationary support element and at least a second cleaning unit of the plurality of cleaning units is attached to the rotary support element.

11 Claims, 5 Drawing Sheets

(58) Field of Classification Search
USPC ......................................................... 198/495
See application file for complete search history.

(56) References Cited

U.S. PATENT DOCUMENTS 6,932,210 B2 * 8/2005 Kramer .................... A61J 3/10
198/493
2016/0107844 A1 * 4/2016 Lelie ..................... B65G 45/22
198/495

* cited by examiner

CLEANING SYSTEM FOR A TRANSPORTING AND STORING DEVICE HAVING ADJUSTABLE CAPACITY FOR TOBACCO INDUSTRY ROD-LIKE ELEMENTS

RELATED APPLICATIONS

This application is a continuation of European patent application EP16161665.1 titled "A CLEANING SYSTEM FOR A TRANSPORTING AND STORING DEVICE HAVING ADJUSTABLE CAPACITY FOR TOBACCO INDUSTRY ROD-LIKE ELEMENTS," filed Mar. 22, 2016, which is assigned to the assignee hereof and is expressly incorporated herein by reference.

Technical Field

The present disclosure relates to a cleaning system for a transporting and storing device having adjustable capacity for tobacco industry rod-like elements.

BACKGROUND

In tobacco industry, buffering reservoirs are used, which are positioned in production lines between machines, whose output may change in time, or which may be temporarily deactivated, for example cigarette machines, machines for producing filtering rods, packaging machines. Such reservoirs may be described as adjustable-capacity multilevel transporting and storing devices used for transporting between the machines and temporarily storing rod-like elements, such as acetate filtering rods, multi-segment filtering rods comprising loose material or other fillers, or complete cigarettes. Such reservoirs are typically located between the machines for producing the rod-like elements and the machines for packing them into packages or containers. A buffering machine of such type is described in a European patent EP2219480. The machine comprises circular support elements of the same diameter, arranged coaxially in a stack one above another, on which there are located circular conveyors for transporting rod-like elements arranged in a plurality of layers transversal to their direction of transport. The conveyor of such reservoir may have a form of an endless chain or an endless belt and may comprise its own driver unit.

The produced rod-like elements often comprise loose filtering material, such as charcoal granulate, which falls from the products onto the conveyor during the transportation. When cigarettes are transported, tobacco may fall from the their tips onto the transporting conveyor. The fallen loose material located on the conveyor may significantly influence the cleanness and quality of the transported rod-like elements.

Moreover, filling and emptying the reservoir with elements coming from different production batches, may increase the risk of leaving a single article on the conveyor and mixing it with other elements produced in the following batch of elements entering the reservoir.

A typical practice for cleaning the conveyors in machines in the tobacco industry is to use a compressed air gun by an operator. Such a method is applicable only when the operator has a sufficient access to the conveyor.

There are known devices for cleaning conveyors transporting rod-like elements in the tobacco industry. A European patent EP1661634 discloses a device for cleaning a conveyor configured to receive rod-like tobacco industry products. A disadvantage of this device is related to large dimensions of a cleaning chamber, through which the cleaned conveyor passes.

There is a need to provide a cleaning system to ensure cleanness of the conveyor and cleanness of the transported elements, and to eliminate the risk of mixing of the elements coming from different production batches.

SUMMARY

There is disclosed herein a cleaning system for a transporting and storing device having adjustable capacity for tobacco industry rod-like elements, the device comprising at least one circular conveyor located on a stationary support element of the device and at least one circular conveyor of the device located on a rotary support element, wherein the conveyors are arranged one above another, and wherein the cleaning system comprises a plurality of cleaning units attached to the support elements and oriented towards a transporting surface of the conveyor located below a corresponding cleaning unit of the plurality of cleaning units and configured to remove contaminations from the transporting surface of the conveyor, wherein at least a first cleaning unit of the plurality of cleaning units is attached to the stationary support element and at least a second cleaning unit of the plurality of cleaning units is attached to the rotary support element.

The plurality of cleaning units may comprise at least one compressed air nozzle.

At least one compressed air nozzle may be oriented at an angle from 0 degrees to 45 degrees with respect to a vertical axis towards the transporting surface of the conveyor.

Above at least one conveyor there may be arranged radially at least first and second cleaning units of the plurality of cleaning units.

At least a first cleaning unit of the plurality of cleaning units attached to the stationary support element may be configured to clean the conveyor located on the rotary support element.

At least one second cleaning unit of the plurality of cleaning units attached to the rotary support element is configured to clean the conveyor located on the stationary support element.

There is also disclosed a multilevel reservoir having adjustable capacity and comprising the cleaning system as described above.

There is also disclosed a method for cleaning a transporting and storing device having adjustable capacity for tobacco industry rod-like elements, the transporting and storing device having at least a first circular conveyor located on a stationary support element and at least a second circular conveyor located on a rotary support element, wherein the at least a first and second circular conveyors are arranged one above another, wherein a plurality of cleaning units are attached to the support elements and oriented towards a transporting surface of the conveyor located below a corresponding cleaning unit of the plurality of cleaning units and configured to remove contaminations from the transporting surface of the conveyor, the method comprising the steps of: activating consecutively the plurality of cleaning units in order to remove contaminations, starting from an uppermost cleaning unit of the plurality of cleaning units, down to a lowermost cleaning unit of the plurality of cleaning units; removing the contaminations from the conveyor located on the rotary support element by at least one cleaning unit of the plurality of cleaning units attached to the stationary support element; and removing the contaminations from the conveyor located on the stationary support element by at least one cleaning unit of the plurality of cleaning units attached to the rotary support element.

The method may additionally comprise, after removing the contaminations from the transporting surface of the conveyor, starting the removal of the contaminations from the transporting surface of the conveyor located below.

The method may additionally comprise removing the contaminations from the conveyor by an air stream directed from at least one compressed air nozzle of the plurality of cleaning units.

The method may further comprise orienting the airflow output from at least one nozzle at an angle from 0 to 45 degrees with respect to the vertical axis towards a transporting surface of the conveyor.

The method may further comprise removing contaminations from at least one conveyor by at least two cleaning units arranged radially in equal spacing above the conveyor, such that each cleaning unit is configured to remove contaminations only from a fragment of the entire length of the conveyor.

BRIEF DESCRIPTION OF FIGURES

The system is shown by means of example embodiments in a drawing, in which.

DETAILED DESCRIPTION

Figure 1:
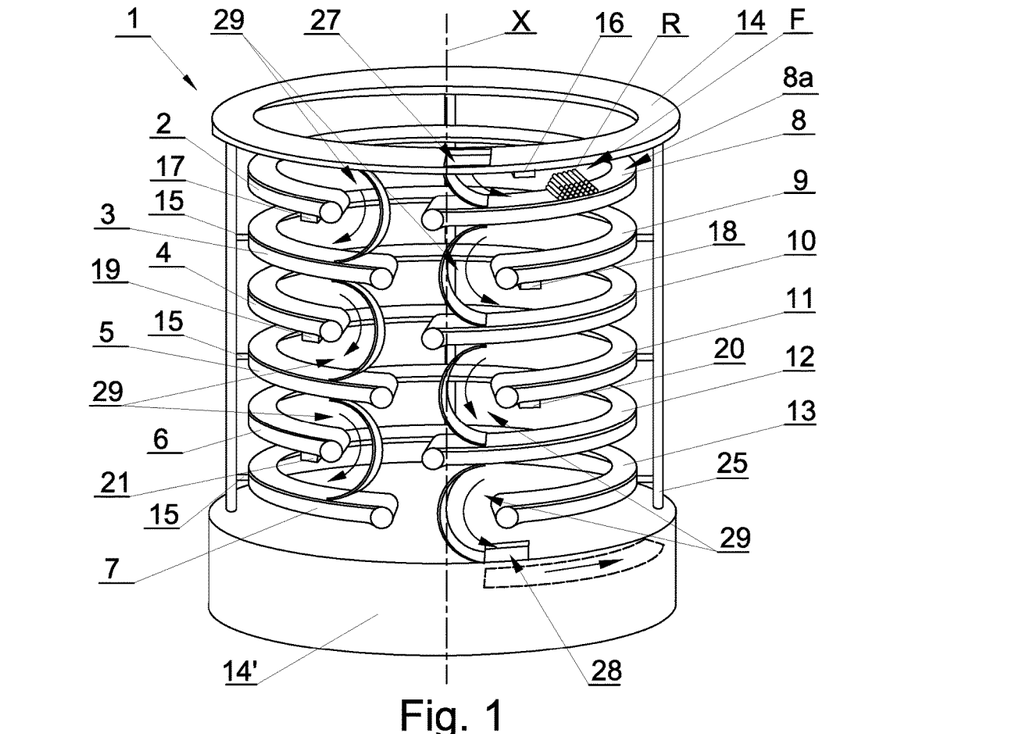
FIG. 1 shows an isometric view of a first embodiment of a transporting and storing device having adjustable capacity for tobacco industry rod-like elements.

FIG. 1 shows a multilevel transporting and storing device 1 having adjustable capacity for tobacco industry rod-like elements in an isometric view. In the following description this device may be simply called a reservoir. The reservoir 1 has a plurality of levels defined by circular support elements 2-7, on which there are placed endless circular conveyors 8-13. The device 1 has an inlet 27, through which rod-like elements R are fed, and an outlet 28 through which the rod-like elements R are outfed from the reservoir. The rod-like elements that are fed into the reservoir through the inlet 27 are positioned on the uppermost conveyor, along which they are transported in a form of a multilayer flow (only a fragment of the mass flow F is shown). Next, they move through a duct 29 and are placed on a consecutive conveyor below. As a result of consecutive displacements, depicted by arrows, through consecutive levels of the device, the rod-like elements are moved to the lowermost conveyor and are outfed from the reservoir through the outlet 28. The buffering capacity of the reservoir 1 is adjustable by an angular change of position of the reservoir conveyors on the neighboring levels, which results in a change of the amount of the accumulated elements between the inlet and the outlet. The consecutive levels of the reservoir are stationary and rotary and are arranged so that rotary levels follow stationary levels and vice versa.

Figure 1A:
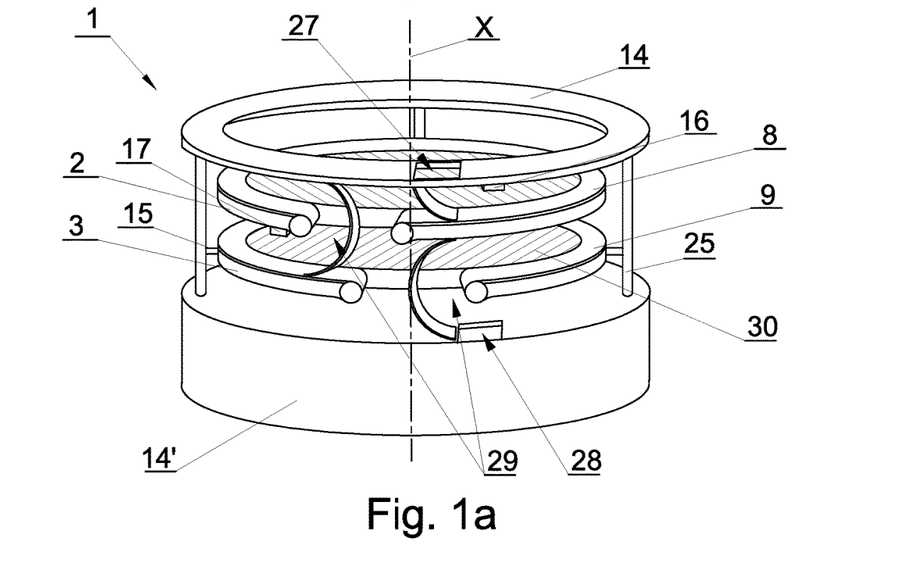
FIG. 1a shows an isometric view of a first embodiment of a transporting and storing device having adjustable capacity for the tobacco industry rod-like elements.

In the presented embodiment, the circular support elements 2-7 have a form of rings, however it is possible to make the circular support elements 2-7 as full wheels 30, wherein the conveyors are positioned on their circumference, as shown in FIG. 1a. The conveyor may have a form of a chain transporter with chain links made for example of plastic, or it may have a form of a belt made of a textile or another material. Each conveyor is equipped with a driver unit (not shown in the figure) for driving the chain or the belt.

A support structure of the reservoir 1 comprises the circular support elements 2-7, 14, 14' which are arranged coaxially and vertically one above another. Vertical gaps between the neighboring circular support elements are adjusted so as to enable the multilayer mass flow F of the rod-like elements R. The circular support elements 2-7, 14, 14' include stationary support elements 3, 5, 7, 14, 14' and rotary support elements 2, 4, 6. In the presented embodiment, the rotary support elements 2, 4, 6 of the reservoir 1 are arranged alternately with the stationary support elements 3, 5, 7, 14 which are connected to a stationary structure 25 of the reservoir 1 with fixing means 15. The reservoir may be configured so that all rotary support elements 2, 4, 6 are connected and have one common driver unit (not shown in the figure). In another embodiment, each rotary support element 2, 4, 6 and thus each conveyor 8, 10, 12 may have an independent driver unit (not shown in the figure) for rotating them about the X axis. Above each conveyor 8, 9, 10, 11, 12, 13 there is located a cleaning unit 16, 17, 18, 19, 20, 21, respectively. Therefore, the system comprises a plurality of cleaning units 16, 17, 18, 19, 20, 21. The process of cleaning of the conveyor begins preferably after the reservoir 1 is completely emptied from the rod-like elements. First, the cleaning unit located above the uppermost conveyor of the reservoir, is activated. After cleaning the uppermost conveyor, the lower conveyors are consecutively cleaned, down to the lowermost conveyor.

Figure 2:
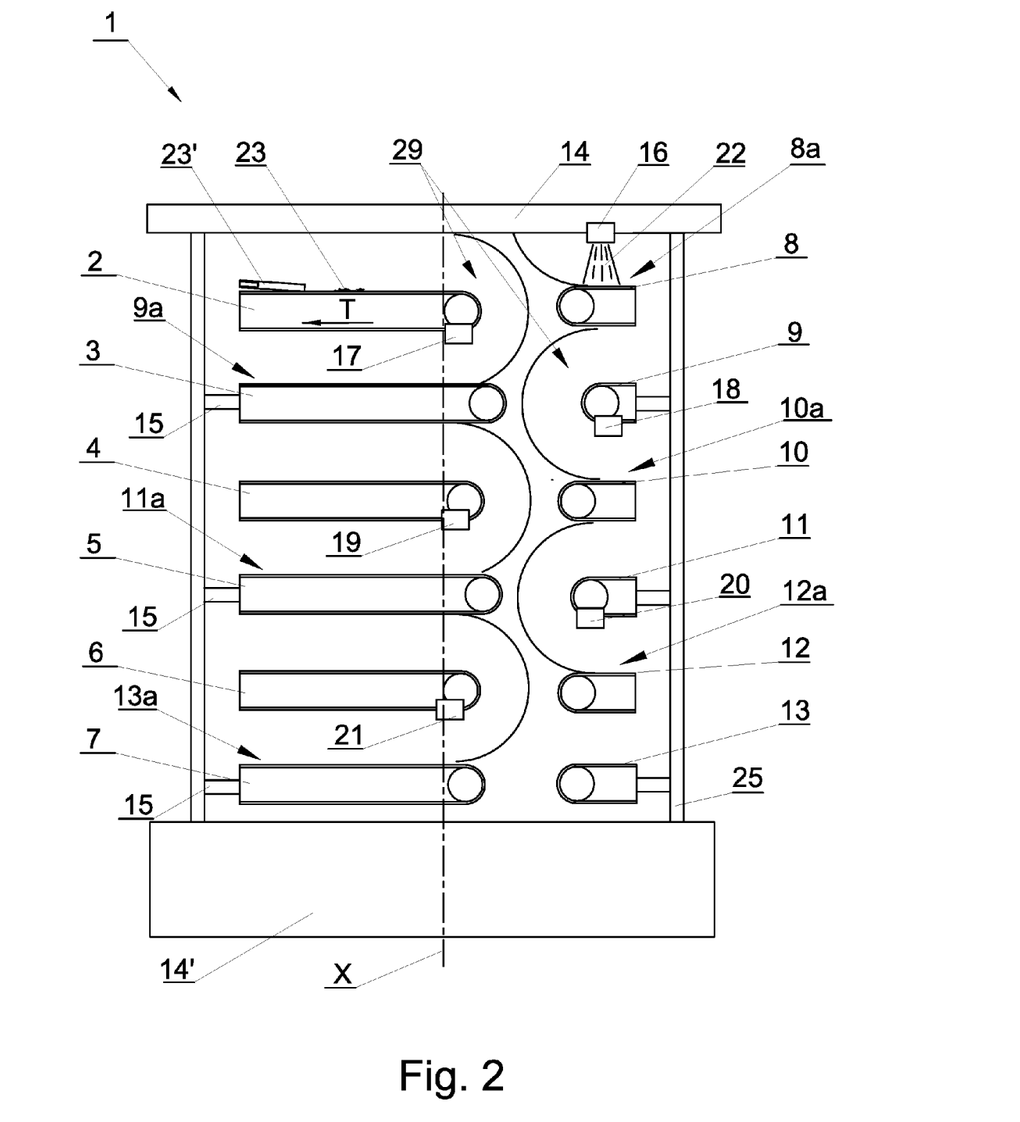
FIG. 2 shows a front view of the transporting and storing device having adjustable capacity for the tobacco industry rod-like elements.

The cleaning unit 16 (which may be referred to as a first cleaning unit of the plurality of cleaning units) shown in FIG. 2 is located above the rotary support element 2 and is attached to the stationary support element 14 of the reservoir 1. Compressed air 22 is blown from the nozzle (shown in FIG. 6) of the cleaning unit 16 towards a transporting surface 8A of the conveyor 8 located on the rotary support element 2. The compressed air 22 used for cleaning the conveyors 8-13 may be ionized in order to remove static charges located on the conveyor surface. The rotary support element 2, during rotation about the X axis in a direction T, causes a corresponding movement of the conveyor 8 under the stream of the compressed air 22. Consequently, the transporting surface 8A of the conveyor 8 is cleaned to remove contaminations 23 and rod-like elements 23' located on it. The contaminations 23 and the rod-like elements 23' may fall on the lower conveyors or to a container located on the lowermost stationary element 14'.

Figure 5:
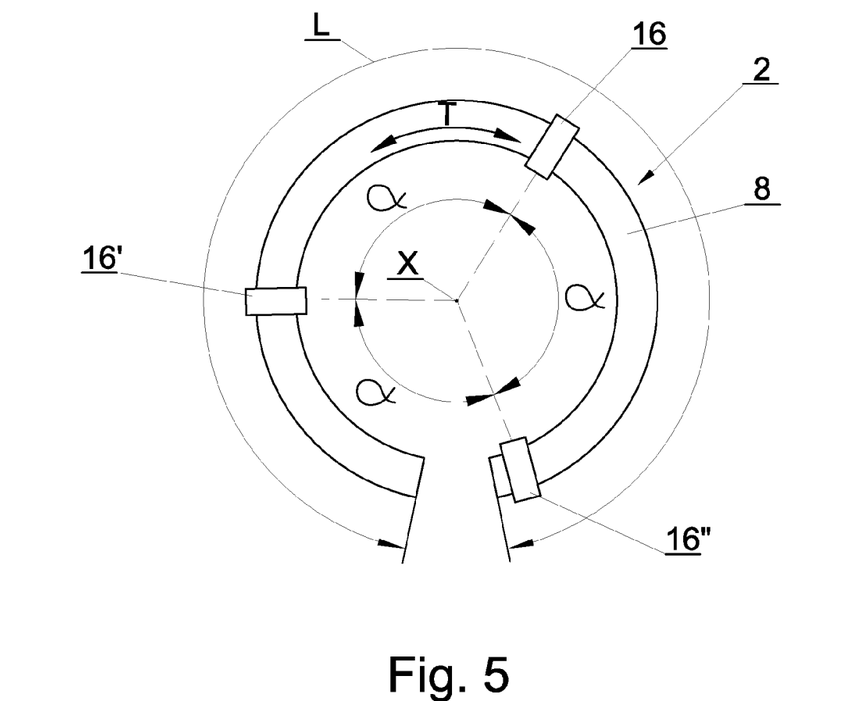
FIG. 5 shows a top view of a distribution of cleaning units above one of the conveyors.

FIG. 5 shows an example of a radial arrangement of the cleaning units 16, 16', 16" above the conveyor 8. The rotary support element 2 rotates about an angle α to cause cleaning of the entire length L of the transporting surface of the conveyor 8. For example, when a single cleaning unit 16, 17, 18, 19, 20, 21 is attached to one of the conveyors 8, 9, 10, 11, 12, 13 of the reservoir 1, then the rotary support element 2, 4, 6 should rotate about an angle close to 360° (wherein during cleaning the conveyor the driver unit of the chain or the belt is activated), so as to clean the entire transporting surface. After the complete cleaning cycle, i.e. after cleaning the entire length L of the conveyor 8, 9, 10, 11, 12, the currently active cleaning unit 16, 17, 18, 19, 20, 21 is deactivated and next the following cleaning unit, located on a lower level, is activated.

Figure 3:
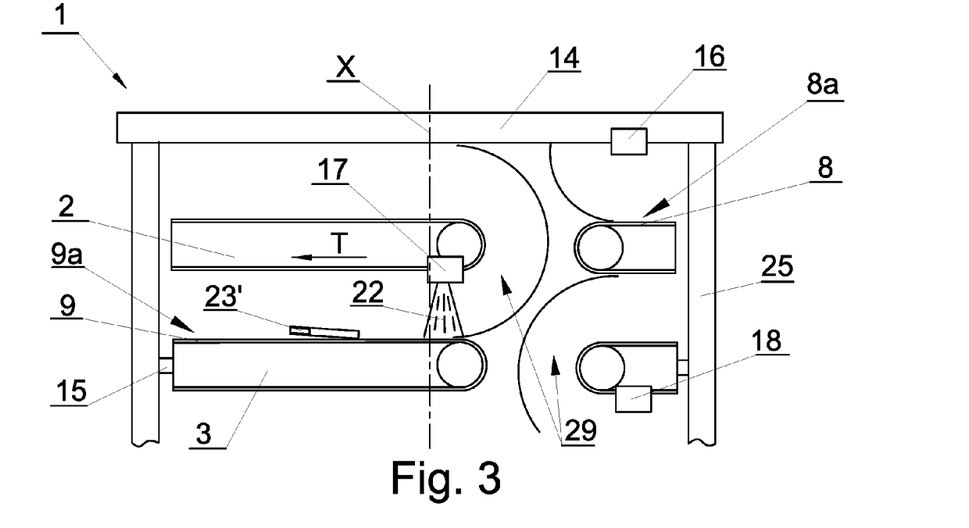
FIG. 3 shows a fragment of the transporting and storing device having adjustable capacity for the tobacco industry rod-like elements during a conveyor cleaning process.

As shown in FIG. 3, after cleaning the transporting surface 8A of the conveyor 8, the transporting surface 9A of the conveyor 9 is cleaned by activating the following cleaning unit 17 (which may be referred to as a second cleaning unit of the plurality of cleaning units) that is attached to the rotary support element 2. During the rotation of the rotary support element 2 in the direction T, the cleaning unit 17 moves along with the support element and cleans, with the compressed airflow 22, the transporting surface 9A of the conveyor 9 located on the stationary support element 3 located below. Similarly to cleaning the conveyor of the preceding level, depending on the amount of the radially arranged cleaning units 17, the rotary support element 2 rotates about the axis X about the angle α necessary to clean the conveyor 9 along its entire length L.

Figure 4:
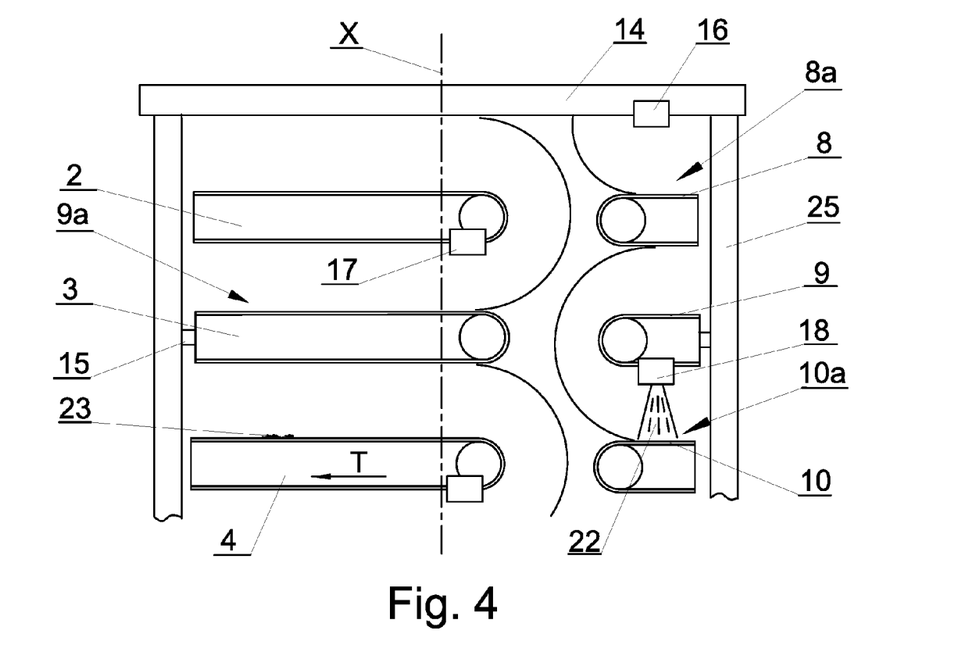
FIG. 4 shows a consecutive fragment of the transporting and storing device having adjustable capacity for tobacco industry rod-like elements during the conveyor cleaning process.

After the complete cleaning cycle, the cleaning unit 17 is deactivated, and the cleaning unit 18 located below, above the consecutive conveyor 10 (as shown in FIG. 4) is activated. The cleaning unit 18 is attached to the stationary support element 3 of the reservoir 1. After activating the cleaning unit 18, the rotary support element 4 rotates about the X axis in the direction T and the conveyor 10 moves correspondingly under the compressed airflow 22, therefore the contaminations 23 located on the conveyor 10 are removed. A similar procedure is followed for the consecutive support elements located below, until the lowermost conveyor is cleaned. After all the conveyors are cleaned, the contaminations present at the bottom of the reservoir may be removed by an operator.

The cleaning units 16, 16', 16" positioned above the conveyor 8 located on the rotary support element 2 are arranged radially in equal spacing so that during the rotation of the support element 2 about the X axis, the entire length L of the conveyor is cleaned. In this embodiment, there are three cleaning units 16, 16', 16" arranged radially above the conveyor 8 and spaced apart by an angle α equal to 120 degrees. In such angular spacing, each cleaning unit 16, 16', 16" is responsible for cleaning ⅓ of the length L of the conveyor 8.

The arrangement of FIG. 5 corresponds to other conveyors 3, 4, 5, 6, 7 as well. In another embodiment, with two cleaning units 16, 16' positioned above the conveyor 8 and spaced apart by 180 degrees, every cleaning unit 16, 16' is responsible for cleaning ½ of the length L of the conveyor 8. Each of the cleaning units 16, 17, 18, 19, 20, 21 comprises at least one nozzle 24 for blowing compressed air.

Figure 6:
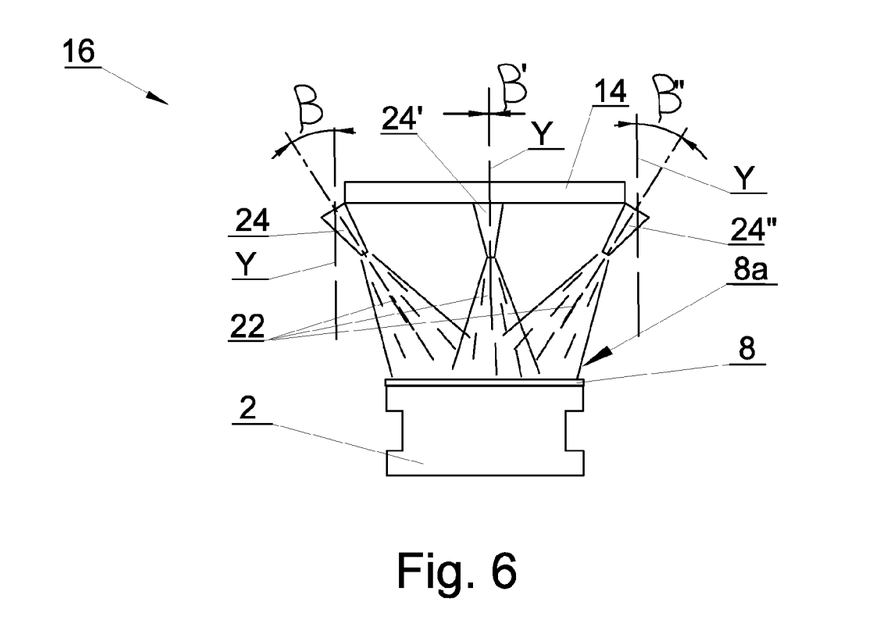
FIG. 6 shows a front view of an angular position of the cleaning units with respect to a surface of the conveyor.
Figure 6A:
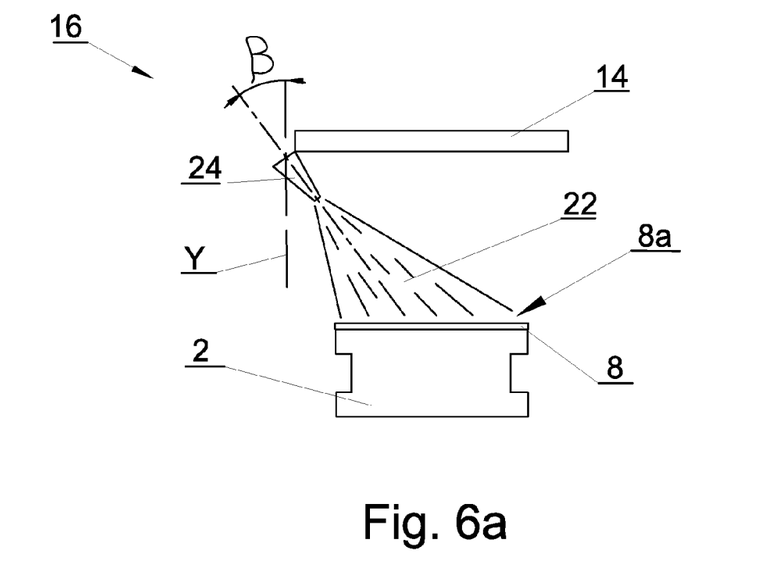
FIG. 6a shows a front view an angular position of a compressed air nozzle with respect to the surface of the conveyor.
Figure 7:
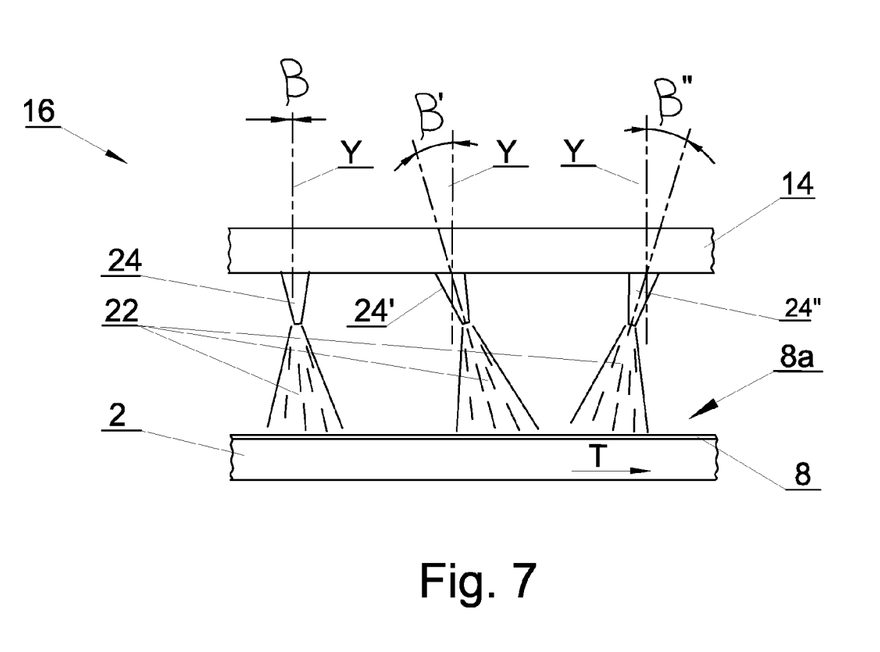
FIG. 7 shows an example of an arrangement of the compressed air cleaning nozzles with respect to each other above the conveyor.

FIG. 6 shows the location of the cleaning unit 16 with respect to the transporting surface 8a of the conveyor 8 in a view of the transporting direction. In this embodiment, the cleaning unit 16 comprises three compressed air nozzles 24, 24', 24". The cleaning unit 16 attached to the stationary support element 14 of the reservoir 1 is responsible for cleaning the transporting surface 8A of the conveyor 8 located on the rotary support element 2 positioned below, as well as the side areas of the conveyor 8. In order to clean the conveyor 8 accurately by blowing away the contaminations 23 located in grooves between the chain elements, the nozzles 24, 24', 24" are directed towards the transporting surface of the conveyor 8 and are arranged at an angle β, β', β" with respect to the vertical axis Y. The side nozzles 24, 24" located on both sides of the conveyor 8 are arranged at an angle β, β" from 0 to 90 degrees with respect to the vertical axis Y, preferably from 0 to 45 degrees with respect to the vertical axis Y, preferably at an angle of 15 degrees. The cleaning unit 16 may also comprise a single nozzle 24 arranged at an angle β from 0 to 90 degrees with respect to the vertical axis Y, preferably from 0 to 45 degrees with respect to the vertical axis Y, in the direction of the transporting surface of the conveyor 8 (FIG. 6a), or may comprise several nozzles arranged at an angle β from 0 to 90 degrees with respect to the vertical axis Y, preferably from 0 to 45 degrees with respect to the vertical axis Y located on both sides of the conveyor 8 linearly or with offset to each other (FIG. 7). The angle β at which the nozzles 24, 24', 24" are arranged with respect to the vertical axis Y may have a positive and/or a negative value. Appropriate orientation of the compressed airflow 22 allows to blow away the contaminations 23 and the rod-like elements 23' and to accumulate them in the base area of the reservoir 1, from where they may be subsequently removed by the operator, for example using a vacuum cleaner.

The invention claimed is:

1. A cleaning system for a transporting and storing device having adjustable capacity for tobacco industry rod-like elements, the device comprising at least one circular conveyor located on a stationary support element and at least one circular conveyor located on a rotary support element, the stationary support element and the rotary support element being arranged one above another, the cleaning system comprising a plurality of cleaning units, each of the plurality of cleaning units being attached to one of the support elements and oriented towards a corresponding transporting surface of the at least one circular conveyor on another support element located below the one support element, at least one cleaning unit of the plurality of cleaning units being attached to the stationary support element and at least another cleaning unit of the plurality of cleaning units being attached to the rotary support element.

2. The cleaning system according to claim 1, wherein the plurality of cleaning units comprises at least one compressed air nozzle.

3. The cleaning system according to claim 2, wherein at least one compressed air nozzle is oriented at an angle from 0 degrees to 45 degrees with respect to a vertical axis towards the corresponding transporting surface of at least one of the at least one circular conveyor located on the stationary support element and the at least one circular conveyor located on the rotary element.

4. The cleaning system according claim 1, wherein a first cleaning unit of the plurality of cleaning units and a second cleaning unit of the plurality of cleaning units are arranged radially over at least one of the at least one circular conveyor located on the stationary support element and the at least one circular conveyor located on the rotary support element.

5. The cleaning system according to claim 1, wherein at least a first cleaning unit of the plurality of cleaning units is attached to the stationary support element and is configured to clean the at least one circular conveyor located on the rotary support element.

6. The cleaning system according to claim 1, wherein at least one second cleaning unit of the plurality of cleaning units is attached to the rotary support element and is configured to clean the at least one circular conveyor located on the stationary support element.

7. A method for cleaning a transporting and storing device having adjustable capacity for tobacco industry rod-like elements, the transporting and storing device having at least a first circular conveyor located on a stationary support element and at least a second circular conveyor located on a rotary support element, wherein the at least the first circular conveyor and the at least the second circular conveyor are arranged one above another, wherein a plurality of cleaning units are attached to the support elements and oriented towards a transporting surface of the at least the first and at least the second circular conveyors located below a corresponding cleaning unit of the plurality of cleaning units, the cleaning units configured to remove contaminations from the transporting surface of the at least the first and the at least the second circular conveyors,
the method comprising:
   activating consecutively the plurality of cleaning units in order to remove contaminations, starting from an uppermost cleaning unit of the plurality of cleaning units, down to a lowermost cleaning unit of the plurality of cleaning units;
   removing the contaminations from the at least the second circular conveyor located on the rotary support element by at least one cleaning unit of the plurality of cleaning units attached to the stationary support element; and
   removing the contaminations from the at least the first circular conveyor located on the stationary support element by at least one cleaning unit of the plurality of cleaning units attached to the rotary support element.

8. The method according to claim 7, additionally comprising:
   after removing the contaminations from the transporting surface of the at least the first and the at least the second circular conveyors, starting the removal of the contaminations from the transporting surface of the at least the first and the second circular conveyors located below.

9. The method according to claim 7, additionally comprising:
   removing the contaminations from at least one of the at least the first circular conveyor and the at least the second circular conveyor by an air stream directed from at least one compressed air nozzle of the plurality of cleaning units.

10. The method according to claim 9, further comprising: orienting an airflow output from at least one nozzle at an angle from 0 to 45 degrees with respect to the vertical axis towards the transporting surface of at least one of the at least the first circular conveyor and the at least the second circular conveyor.

11. The method according to claim 7, further comprising: removing contaminations from at least one of the at least the first circular conveyor and the at least the second circular conveyor, by at least two cleaning units arranged radially in equal spacing above at least one of the at least the first circular conveyor and the at least the second circular conveyor, such that each cleaning unit is configured to remove contaminations only from a fragment of the entire length of at least one of the first circular conveyor and the second circular conveyor.

* * * * *